US006170007B1

(12) United States Patent
Venkatraman et al.

(10) Patent No.: US 6,170,007 B1
(45) Date of Patent: Jan. 2, 2001

(54) EMBEDDING WEB ACCESS FUNCTIONALITY INTO A DEVICE FOR USER INTERFACE FUNCTIONS

(75) Inventors: Chandrasekar Venkatraman, Fremont; Jeffrey A. Morgan, Cupertino, both of CA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/387,278

(22) Filed: Aug. 31, 1999

Related U.S. Application Data

(63) Continuation of application No. 08/740,289, filed on Oct. 25, 1996, now Pat. No. 5,956,487.

(51) Int. Cl.[7] .............................. G06F 17/00; G06F 13/14
(52) U.S. Cl. ...................... 709/218; 709/202; 709/203; 707/10; 707/513
(58) Field of Search .................................. 709/202, 203, 709/217, 218; 707/513, 10

(56) References Cited

U.S. PATENT DOCUMENTS

| | | | |
|---|---|---|---|
| 4,899,129 | 2/1990 | MacFadyen et al. ................. 340/310 |
| 4,899,217 | 2/1990 | MacFadyen et al. .................. 358/86 |
| 5,268,666 | 12/1993 | Michel et al. ........................ 340/310 |
| 5,295,242 | 3/1994 | Mashruwala et al. ............... 395/159 |
| 5,500,715 | * 3/1996 | Ta et al. ................................... 399/1 |
| 5,519,878 | 5/1996 | Dolin, Jr. ............................ 395/800 |
| 5,548,779 | * 8/1996 | Andert et al. ....................... 709/203 |
| 5,566,278 | * 10/1996 | Patel et al. ........................... 395/114 |
| 5,570,085 | 10/1996 | Bertsch ............................ 340/825.07 |
| 5,636,211 | 6/1997 | Newlin et al. ....................... 370/465 |
| 5,699,494 | * 12/1997 | Colbert et al. ....................... 395/114 |
| 5,701,451 | 12/1997 | Rogers et al. ....................... 395/600 |
| 5,708,776 | 1/1998 | Kikinis ............................ 395/185.08 |
| 5,715,453 | 2/1998 | Stewart ................................ 395/615 |
| 5,715,823 | 2/1998 | Wood et al. ..................... 128/660.01 |
| 5,727,159 | 3/1998 | Kikinis ................................. 395/200 |
| 5,732,074 | 3/1998 | Spaur et al. ......................... 370/313 |
| 5,734,835 | 3/1998 | Selker .............................. 395/200.79 |
| 5,751,956 | 5/1998 | Kirsch ................................. 395/200 |
| 5,761,071 | 6/1998 | Bernstein et al. ............... 364/479.07 |
| 5,761,280 | 6/1998 | Noonen et al. ................... 379/93.27 |
| 5,761,673 | 6/1998 | Bookman et al. ................... 707/104 |
| 5,764,910 | 6/1998 | Shachar .............................. 395/200 |
| 5,805,442 | 9/1998 | Crater et al. ........................ 364/138 |
| 5,850,573 | * 12/1998 | Wada ................................... 710/62 |
| 5,893,908 | * 4/1999 | Cullen et al. ........................... 707/5 |
| 5,901,286 | * 5/1999 | Danknick et al. ................... 709/203 |
| 5,905,906 | * 5/1999 | Goffinet et al. ..................... 395/114 |
| 5,974,234 | * 10/1999 | Levine et al. ....................... 395/114 |
| 5,978,477 | * 11/1999 | Hull et al. ............................. 380/9 |
| 5,995,721 | * 11/1999 | Rourke et al. ...................... 395/114 |
| 6,003,078 | * 12/1999 | Kodimer et al. .................... 709/224 |
| 6,012,083 | * 1/2000 | Savitzky et al. .................... 709/202 |
| 6,020,973 | * 2/2000 | Levine et al. ....................... 358/1.15 |
| 6,021,429 | * 2/2000 | Danknick ............................ 709/208 |
| 6,029,182 | * 2/2000 | Nehab et al. ....................... 707/523 |
| 6,029,238 | * 2/2000 | Furukawa .............................. 712/1 |

FOREIGN PATENT DOCUMENTS

WO97/18636   5/1997  (WO).

OTHER PUBLICATIONS

IBM Technical Disclosure Bulletin—vol. 38, No. 12, Dec. 1995, Disk Drive With Embedded Hyper–Text Markup Language Server.

* cited by examiner

Primary Examiner—Kevin J. Teska
Assistant Examiner—William Thomson
(74) Attorney, Agent, or Firm—Thomas Li

(57) ABSTRACT

Web access functionality is embedded in a device to enable low cost widely accessible and enhanced user interface functions for the device. A web server in the device provides access to the user interface functions for the device through a device web page. A network interface in the device enables access to the web page by a web browser such that a user of the web browser accesses the user interface functions for the device through the web page.

32 Claims, 6 Drawing Sheets

EMBEDDING WEB ACCESS FUNCTIONALITY INTO A DEVICE FOR USER INTERFACE FUNCTIONS

CROSS REFERENCE TO RELATED APPLICATION(S)

This is a continuation of application Ser. No. 08/740,289 filed on Oct. 25, 1996 now U.S. Pat. No. 5,956,487.

BACKGROUND OF THE INVENTION

1. Field of Invention

The present invention pertains to the field of user interfaces for devices. More particularly, this invention relates to embedding web access functionality into devices to provide enhanced and widely accessible user interface functions.

2. Art Background

A wide variety of devices including office equipment, home-based equipment, and lab equipment, as well as a variety of other types of devices commonly provide device specific user interface functions. Such devices may also be referred to as gadgets. Office equipment includes, for example, printers, fax machines, copiers, and various types of communication and telephony devices. Home-based devices include home entertainment equipment such as televisions and video and audio players and recorders as well as security systems, automobiles, appliances, thermostats, and hot tubs. Lab equipment includes measurement devices such as oscilloscopes, spectrum analyzers and other types of measurement equipment as well as networking equipment.

The user-interface mechanisms of such devices commonly include relatively simple and low cost user input and display mechanisms. Such simple mechanisms may include, for example, light emitting elements such as LED/LCD elements as well as various types of simple input buttons or switches. Such simple mechanisms are typically constructed to be low cost to minimize the overall cost of such devices. In addition, such mechanisms are usually compact and enable relatively small sizes for such devices. Unfortunately, such simple user interface mechanisms severely limit the range and flexibility of the user interface functions provided by such devices.

The user-interface functions of such a device may be enhanced by the implementation of a screen-based user interface mechanism within the device. For example, such a device may include a display screen, and a rendering processor along with appropriate software for generating a rich graphical user interface suitable for the particular type of device. However, such screen displays and rendering mechanisms are usually expensive and increase the overall cost of the device. Such high costs are typically unsuitable for lower cost devices targeted for a relatively large mass market. Moreover, display screens and associated hardware may be too bulky for the size constraints of many devices.

A screen-based user interface may be provided for a device using an external computer system. For example, the device may be connected to the computer system through either a standard connection such as a serial or parallel port connection or through a specialized hardware interface. The external computer system usually executes a set of software for communication and user interface to the device. The external computer system may implement a screen-based user interface for the device. The external computer system may also execute web server software that enables external web browsers to access the computer system and in turn the user interface of the device.

Unfortunately, such an external computer system greatly increases the cost of providing a screen-base user interface for a device. In addition, such prior computer system based solutions usually require the development of specialized software for each particular type of device. Moreover, such specialized software for a particular device from a particular manufacturer must typically be developed for differing types of computer system platforms. Such a variety of differing software for differing platforms greatly complicates the task of providing support for the devices. Furthermore, the development and support costs of such a variety of software usually increase the overall cost of providing a screen based user interface for such devices.

SUMMARY OF THE INVENTION

A solution for providing widely accessible, low cost, and enhanced user interface functions for a S device is disclosed. The solution involves embedding web access functionality into the device including a web server that provides a device web page. The device includes an embedded network interface that enables access to the device web page by a web browser. A user of the web browser accesses the user interface functions for the device through the device web page. The web server functionality may be implemented with existing circuitry in a device, such as an existing processor, memory, and input/output circuitry that normally perform device-specific functions, thereby avoiding the extra cost and space required for dedicated web server hardware for the device.

The web server functionality embedded in the device enables device user interface access via a variety of communication mechanisms including the world wide web portion of the Internet. The costs of providing screen based user interface mechanisms are exported away from the device and do not require an external computer to provide a device web server. The methods and mechanisms disclosed herein provide screen based user-friendly interfaces to a wide variety of devices without the necessity to develop expensive hardware and software applications for differing devices. The present methods and mechanisms employ web technology so that access to a device user interface is independent of the computer system platform employed and independent of the web browser software executed and independent of the location of the user.

The user interface information is packaged using the Hyper-Text Markup Language (HTML) and is transported according to the Hyper-Text Transfer Protocol (HTTP). The HTML and HTTP protocols enable communication with existing web browsers independent of the platform that executes the web browser. The present techniques avoid the need of an industry-wide Application Programming Interface (API) to unify the control and use of equipment.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1A:
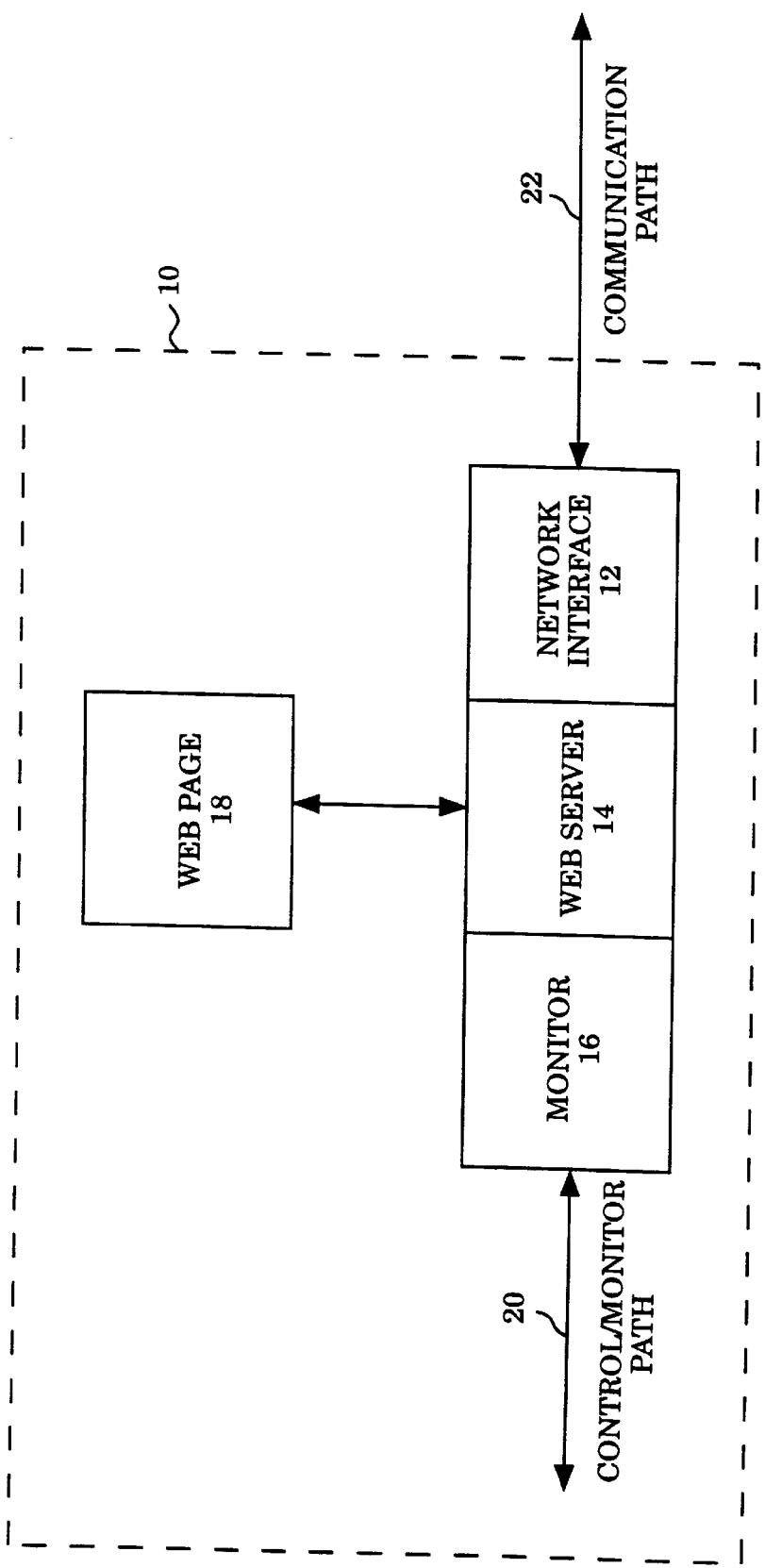
FIGS. 1a–1b illustrate a device with embedded web access functionality that provides device-specific user interface functions through a device web page.

FIG. 1a illustrates a device 10 with embedded web access functionality that provides device-specific user interface functions. The device 10 includes a network interface 12 and a web server 14 along with a monitor 16. The network interface 12 enables communication via a communication path 22. The monitor 16 controls various device-specific functions of the device 10 and monitors a set of information pertaining to the device 10 via a control/monitor path 20. The web server 14 provides web server functions to web clients via the communication path 22. The web server 14 provides web server functions according to the Hyper-Text Transfer Protocol (HTTP).

The web server 14 receives HTTP commands through the network interface 12 that specify a predetermined Universal Resource Locator (URL) for the device 10. The HTTP commands may be used by web clients to read information from the device 10 such as device status information. The HTTP commands may also be used to transfer information to the device 10 such as information that controls the functions or operating states of the device 10. Such HTTP commands include HTTP GET, HTTP POST, and HTTP PUT commands.

In response to an HTTP command targeted for the device 10, the web server 14 generates a web page 18 that defines a set of user interface functions for the device 10. The web page 18 is a Hypertext Markup Language (HTML) file. The network interface 12 transfers the web page 18 to a requesting HTTP client via the communication path 22.

The web server 14 generates the web page 18 dynamically to reflect the updated state of the information pertaining to the device 10 that is maintained by the monitor 16. The web page 18 may also define control buttons according to the HTTP protocol that enable various control functions for the device 10 to be initiated from a web client via the communication path 22. The web page 18 may contain text, images, multimedia files, forms, tables or any object type supported by the HTTP and HTML protocols.

In addition, the web page 18 may contain one or more URLs that specify additional web pages located within the device 10. The web page 18 may also contain one or more URLs that specify additional web pages located elsewhere, i.e. external to the device 10. The additional web pages external to the device 10 may be located, for example, on a local communication network or on the Internet world wide web.

The device 10 represents a wide variety of devices including devices such as printers, fax machines, copiers, communication and telephony devices, home entertainment devices such as televisions, video and audio devices as well as appliances such as refrigerators and washing machines, security systems, automobiles, and hot tubs. The device 10 also represents a variety of measurement instruments including oscilloscopes, and spectrum analyzers and other types of measurement devices. In addition, the device 10 represents a variety of computer peripheral devices including mass storage units such as rotating media storage units.

The communication path 22 represents any communication means that is capable of transferring HTML files according to the HTTP web protocol. The communication path 22 may be realized by a wide variety of communication mechanisms including local area networks, telephone lines including cellular telephone links, serial communication links, parallel communication links, power line communication links, and radio and infrared communication links. The communication path 22 may also be a direct Internet connection to the world-wide web.

Figure 1B:
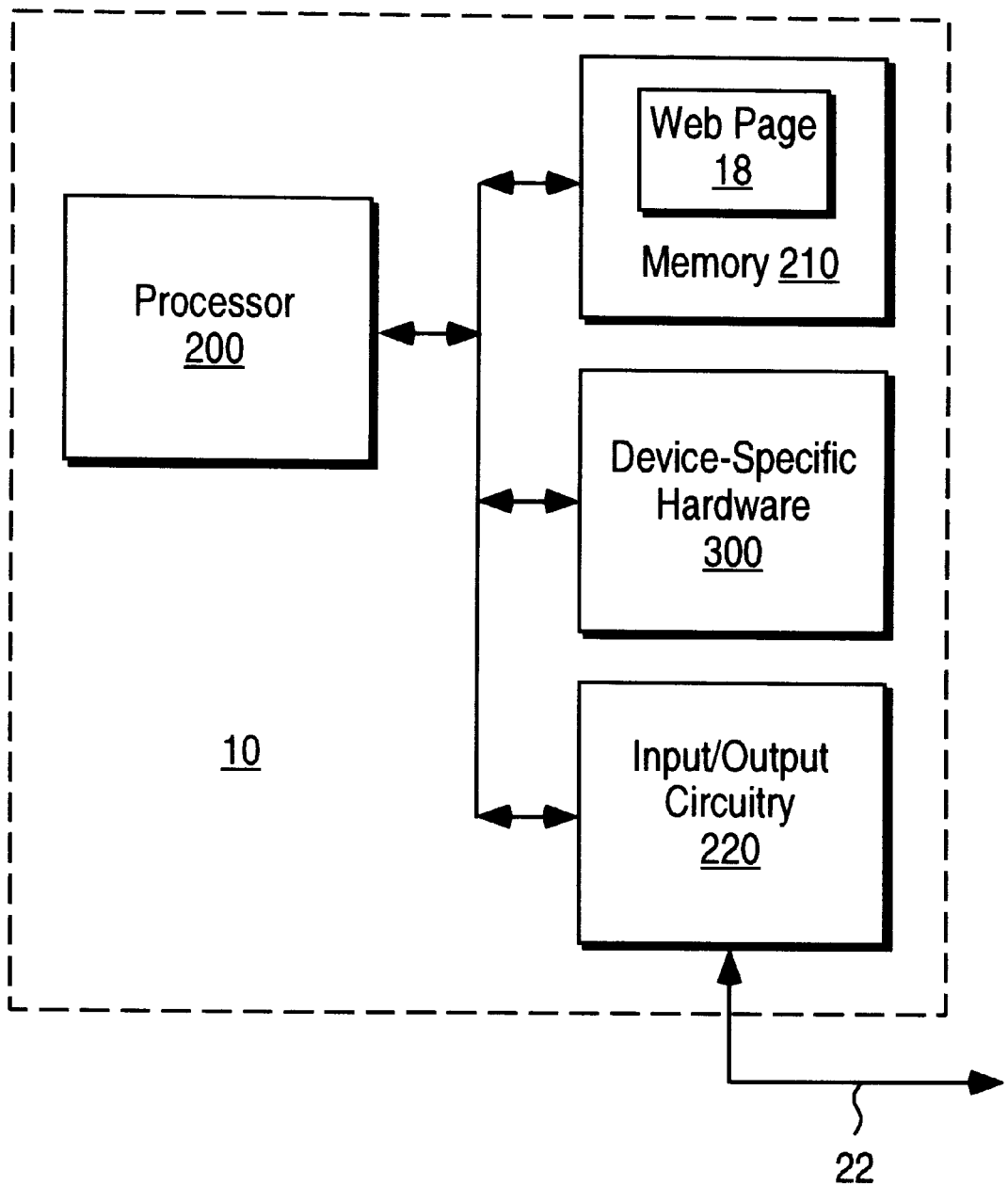

FIG. 1b is a hardware block diagram of the device 10. The device 10 includes a processor 200, a memory 210, a set of device-specific hardware 300 along with a set of input/output circuitry 220 that enables communication via the communication path 22. The processor 200 performs device-specific functions for the device 10 in combination with the device-specific hardware 300. The processor 200 is also employed to provide web server functionality in the device 10. In one embodiment, the processor 200 stores the web page 18 in the memory 210 which may also be used to store information associated with normal device-specific functions.

In one embodiment, the device 10 is a printer device wherein the processor 200 and the memory 210 perform image rendering functions and the device-specific hardware 300 includes printer hardware and associated circuitry and wherein the input/output circuitry 220 provides network access to the printer device 10. The web server functionality is embedded into the printer device 10 by providing software or firmware for the processor 200 and by utilizing space available in the memory 210 and by using the existing input/output circuitry 220 such as Ethernet circuitry to transfer HTML files.

In another embodiment, the device 10 is a video player/recorder wherein the processor 200 and the memory 210 perform functions for reading video and audio information from and writing video and audio information to a storage media such as magnetic tape or an optical storage media. The device-specific hardware 300 includes media actuation hardware such as motors and magnetic heads and associated circuitry for reading and imparting information onto the storage media. The web server functionality is embedded into the video device 10 by providing software or firmware for the processor 200 and by utilizing space available in the memory 210 and by adding the input/output circuitry 220 to the video device 10.

In yet another embodiment, the device 10 is a washing machine wherein the processor 200 and the memory 210 perform-functions for controlling wash cycles. The device-specific hardware 300 includes hardware such as motors, valves, sensors, and associated circuitry. The web server functionality is embedded into the washing machine 10 by providing software or firmware for the processor 200 and by utilizing space available in the memory 210 and by adding the input/output circuitry to the device 10.

The web server functionality for the device 10 includes software executed by the processor 200 that services the HTTP protocol and that generates HTML formatted files. The web page 18 in one embodiment is stored in the memory 210 or may be generated on the fly. The processor 200 also executes communication software that drives the input/output circuitry 220 and provides the functionality of the network interface 12. In addition, the processor 200 executes software that performs control and information monitoring and logging functions of the monitor 16.

In another embodiment, the web server functions of the device 10 are implemented on a single integrated circuit chip including a processor and memory for holding software for servicing the HTTP protocol. In such an embodiment, the hardware portion of the network interface 12 may be implemented on the same integrated circuit chip as the processor or may be external to that chip.

In yet another embodiment, the web server functions of the device 10 are implemented with a state machine.

In another embodiment, the device 10 is a controller module or control computer contained in an automobile. The input/output circuitry 220 such as cellular transmitter/receiver circuitry enables a web browser to access control and status information for the automobile which is contained in the web page 18.

In another embodiment, the device 10 is a mass storage device such as a disk drive or CD-ROM drive. The input/output circuitry 220 such as local area network interface circuitry enables a web browser to access control and status information for the mass storage device which is contained in the web page 18.

In yet another embodiment, the device 10 is a home-entertainment device such as an audio system. The input/output circuitry 220 such as infrared communication circuitry or power line communication circuitry enables a web browser such as a home computer to access control and status information for the audio system which is contained in the web page 18.

The memory 210 may be a static memory such as read-only memory, a flash memory, or a disk drive or may be a volatile memory such as a random access memory. The web page may be stored in the static memory or the random access memory in the HTML format or may be generated on the fly without being stored in the device 10.

Figure 2:
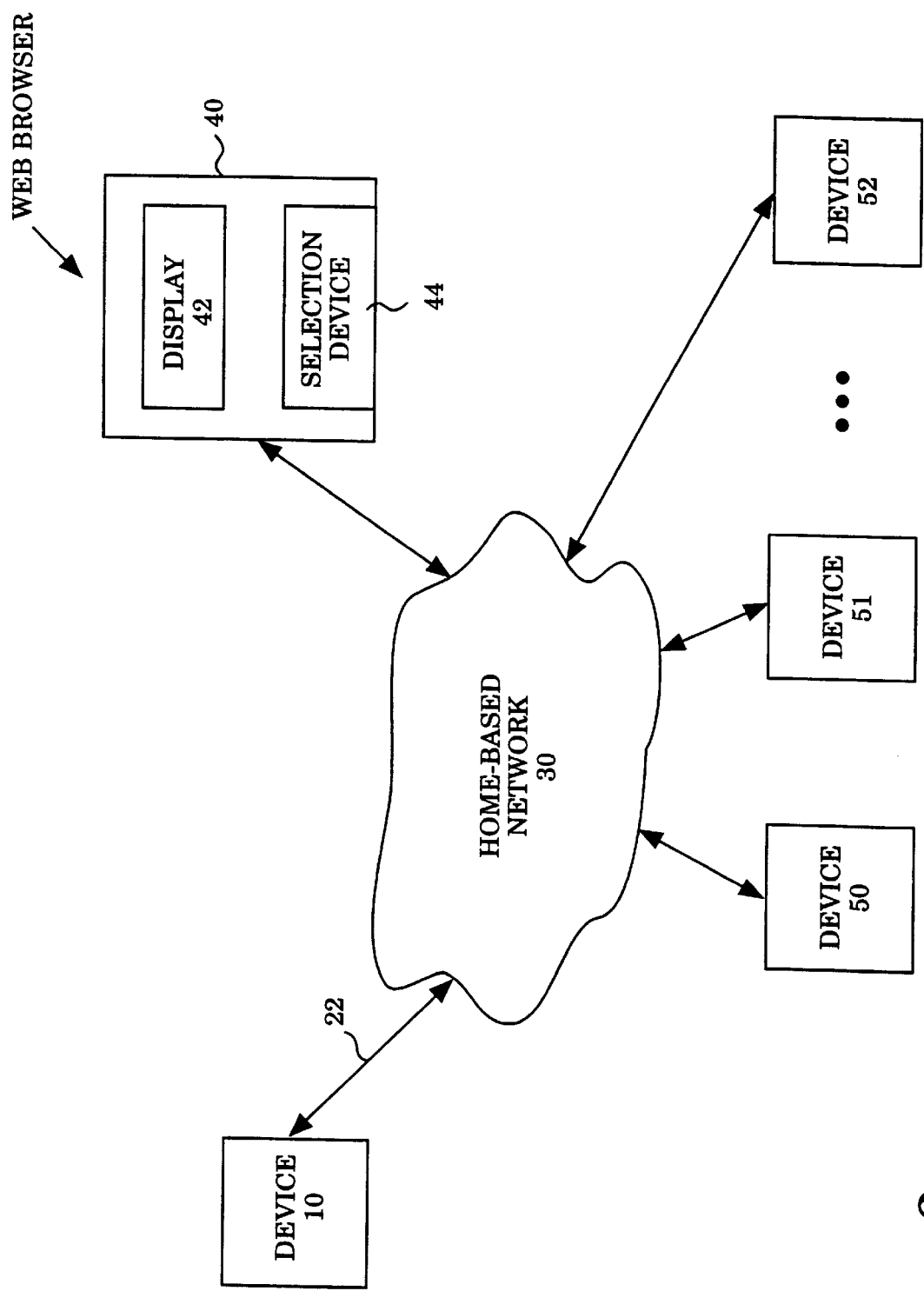
FIG. 2 shows a home-based network that enables a web browser to access the user interface functions through the device web page.

FIG. 2 shows a home-based network 30 that enables a web browser 40 to access the user interface functions of the device 10. The home-based network 30 may be implemented with a variety of communication mechanisms suitable for a home including power line communication links, twisted pair communication links, radio frequency communication links, and infrared communication links.

The web browser 40 includes a display 42 for generating visual objects including text, images, multimedia objects, and graphical user interface objects. The web browser 40 includes a selection device 44 that enables a user to select objects and URL links rendered on the display 42. The web browser 40 may also include an audio capability that enables rendering of audio information to the user.

The home-based network 30 may also enable communication among a set of devices 50–52. The devices 50–52 may include devices such as home appliances, home security systems, home entertainment devices, air-conditioning systems and hot-tubs. Any of the devices 50–52 that implement the device web page mechanisms disclosed herein may provide device specific user interface web pages to the web browser 40 via the home-based network 30.

The web browser 40 may be embodied in a computer system that executes a set of web browser software. Such a computer system with web browser functionality may be realized by any one of a variety of available computer system platforms including Windows platforms, Macintosh platforms, Unix platforms as well as any other platform capable of executing web browser software that provides HTTP client functions and that renders HTML files.

The web browser 40 may also be embodied in a variety of other devices that provide HTTP client functions and that render HTML files. Such devices include specialized hardware designed for television or telephone systems as well as low cost web browser devices and network computers.

A user accesses and controls the user interface functions of the device 10 using the web browser 40. The user enters a URL corresponding to the device 10 into the web browser 40. In response, the web browser 40 transfers an HTTP command which includes the entered URL over the home-based network 30. The device 10 receives the HTTP command via the communication path 22 and recognizes the URL contained therein.

In one embodiment, the information for the web page 18 is periodically updated by the processor 200 and is stored in HTML format in the memory 210. In such an embodiment, the processor 200 reads the web page 18 from the memory 210 in response to the HTTP command and transfers the web page 18 to the web browser 40 via the home based network 30.

In an alternative embodiment, the processor 200 generates the web page 18 on the fly in response to the HTTP command from the web browser 40. In such an embodiment, the processor 200 obtains information pertaining to the device from the device-specific hardware 300 after receiving the HTTP command and recognizing the URL contained therein. The processor 200 formats the information into the HTML format that defines the web page 18 and transfers the HTML formatted information to the web browser 40 via the home based network 30.

The HTML file is transferred according to the HTTP protocol which specifies the URL corresponding to the web browser 40. The web browser 40 receives the HTML file and renders the web page 18 on the display 42.

The following is an example HTML file that defines the web page 18 in an embodiment wherein the device 10 is a printer device.
<TITLE>Printer Home Page</TITLE>
<H1>home page for device 10</H1>
<HR>
The following information pertains to the device 10 which in this example is a printer
<table border>
<caption> Printer with a URL </caption>
<TR>
<TD>Printer Name</TD>Portdv9</TD>
</TR>
<TR>
<TD>Administrator</Tl><TD>Mr. John Doe</TD>
</TR>
<TR>
<TD>Location</TD><TD>Building 1U</TD>
</TR>
</TABLE>
<P>
<A HREF ="http://www.hpsc.com"> Service Contract</A>
<P>
<A HREF ="http://www.hpsupl.com"> Supplies ordering</A>
<P>
<A HREF ="http://www.hpl.hp.com"> Future Products</A>
<P>
<HR>

Figure 3:
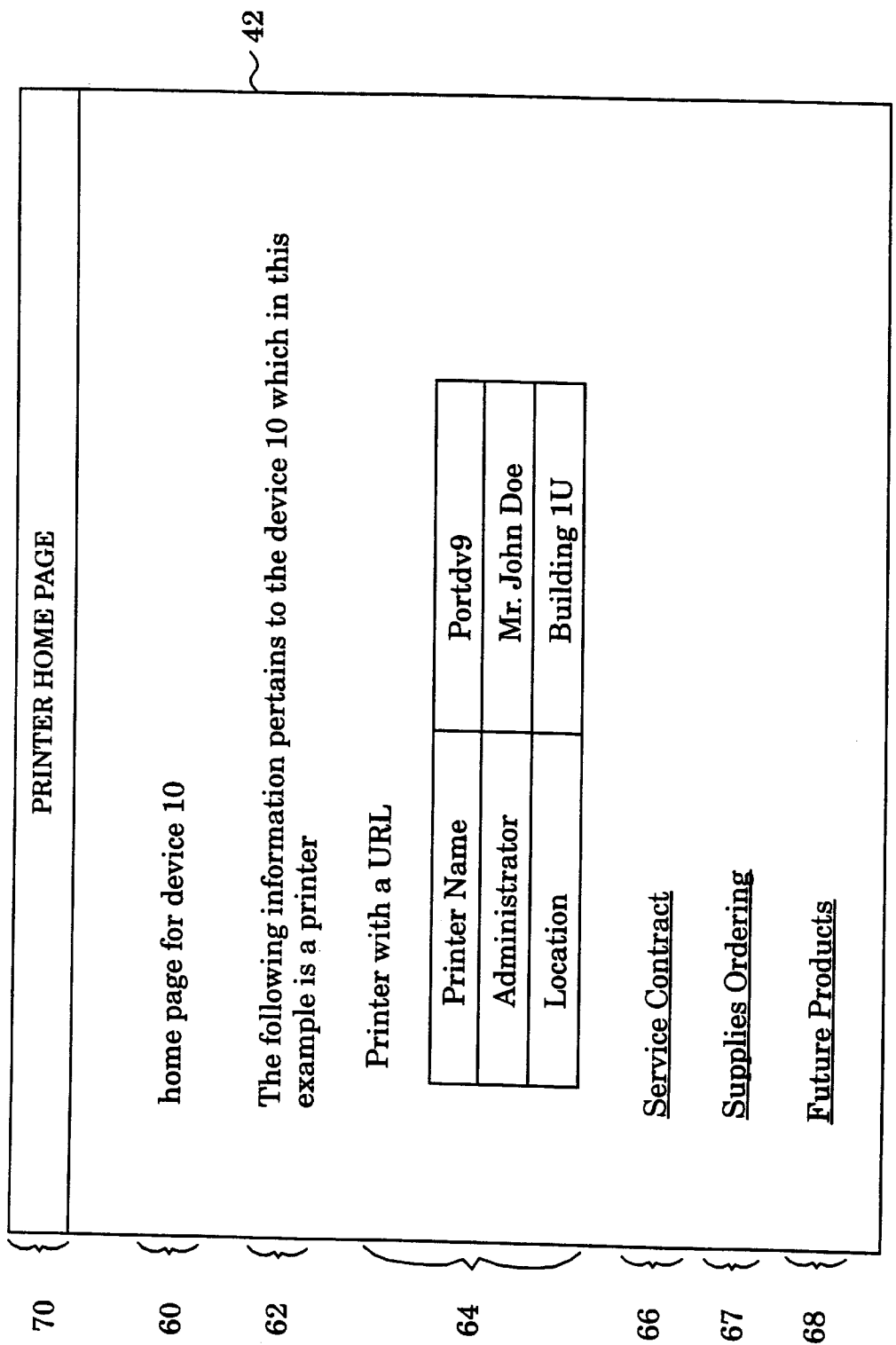
FIG. 3 illustrates an example device web page for a printer device.

FIG. 3 illustrates the web page 18 for the example HTML file shown above wherein the device 10 is a printer. The web page 18 is rendered on the display 42 by the web browser 40 in response to the example HTML code set forth above. The web page 18 includes a page title 70, a header section 60, a set of ASCII text 62, a table section 64, and a set of hyperlinks 66–68.

The page title 70 is defined by the HTML <TITLE>Printer Home Page</TITLE> coding shown above. The header section 60 is defined by the HTML code <H1>Home Page for device 10</H1> in the HTML file shown above. The ASCII text 62 is the ASCII text contained in the HTML file shown above. The table section 64 is defined with coding in the HTML file shown above and provides information pertaining to the printer including a printer name, an administrator, and a location for the printer.

The hyperlinks 66–68 defined in the HTML file shown above direct the web browser 40 to other web pages for various printer support functions. For example, the hyperlink 66 "Service Contract" may be selected by the user with the selection device 44 to direct the web browser 40 to the URL "http://www.hpsc.com" for information regarding printer service contracts. Similarly, hyperlinks 67 and 68 provide links to web pages for ordering printer supplies and obtaining information for future printer products from the manufacturer of the printer device 10.

The web page 18 for the printer may also include manuals, parts lists, and other associated publication. These publication may be stored within the device 10 in, for example, a nonvolatile memory, or may be referenced elsewhere via hyperlinks contained in the web page 18. These publications contain dynamic information such as updated manuals as well as new and updated software driver routines for the device 10.

Figure 4:
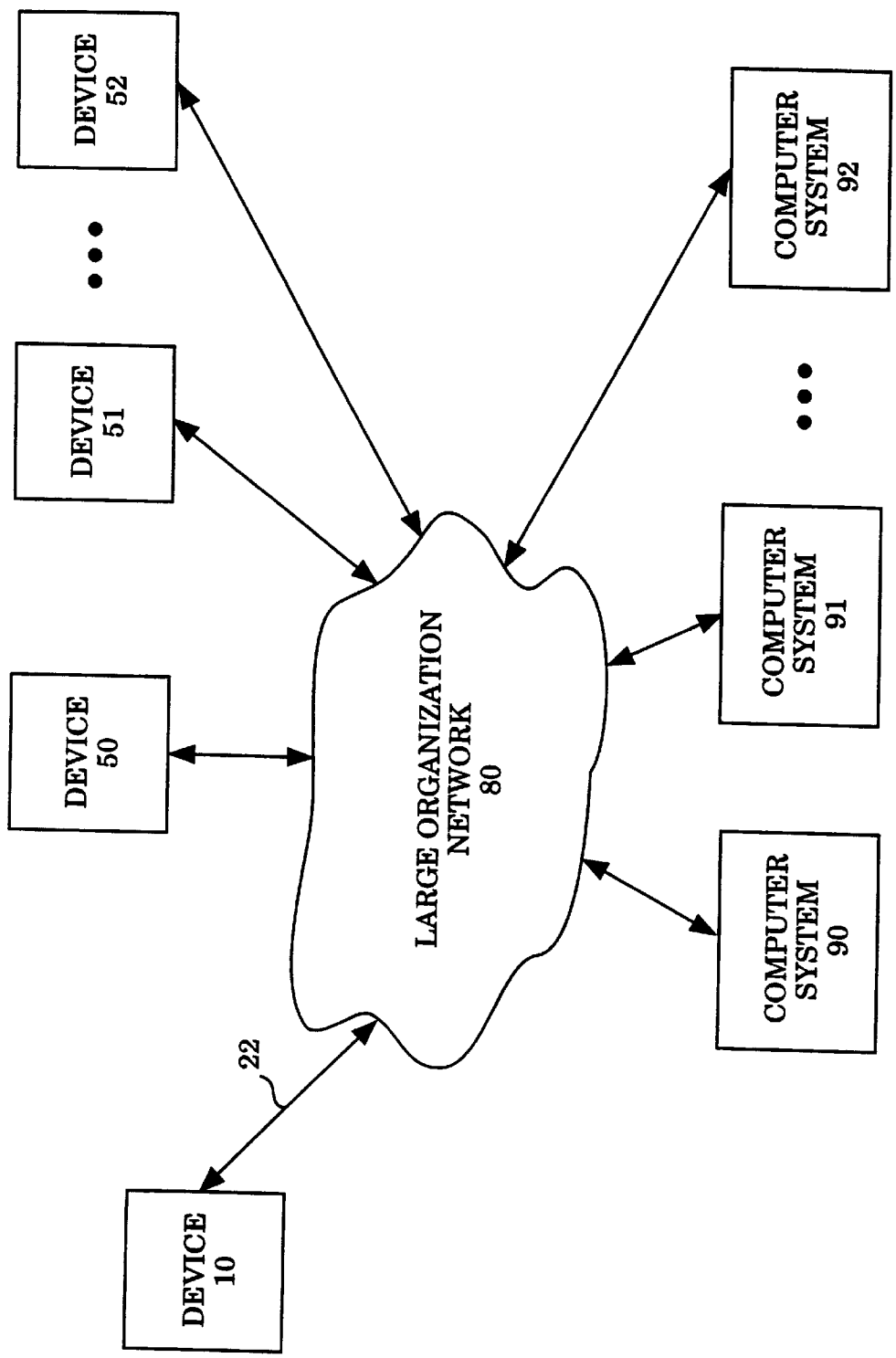
FIG. 4 shows a large organization network or intranet that enables access to the device web pages of differing devices.

FIG. 4 shows a large organization network 80 that enables access to the device web pages of the device 10 and the devices 50–52. The large organization network 80 may be referred to as an Intranet and may be implemented with a variety of communication mechanisms including local area networks connected together by various types of communication links.

Any one or more of a set of computer systems 90–92 coupled to the large organization network 80 may access the device web pages of the devices 10 and 50–52. The computer systems 90–92 may execute one or more of a variety of available web browser software or may have web browser functions built in.

A user of one of the computer systems 90–92 enters a URL corresponding to the desired one of the devices 10 and 50–52 into the corresponding web browser application. In response, the particular web browser application as an HTTP client transfers an HTTP command that specifies the desired URL over the large organization network 80. The device specified by the HTTP command recognizes the URL contained therein. In response, the targeted device transfers an HTML file that defines its device web page via large organization network 80. The transfer of the HTML file specifies the URL of the originating HTTP client computer system from among the computer systems 90–92. The originating HTTP client computer system recognizes its URL and receives and then renders the device web page to the user.

Figure 5:
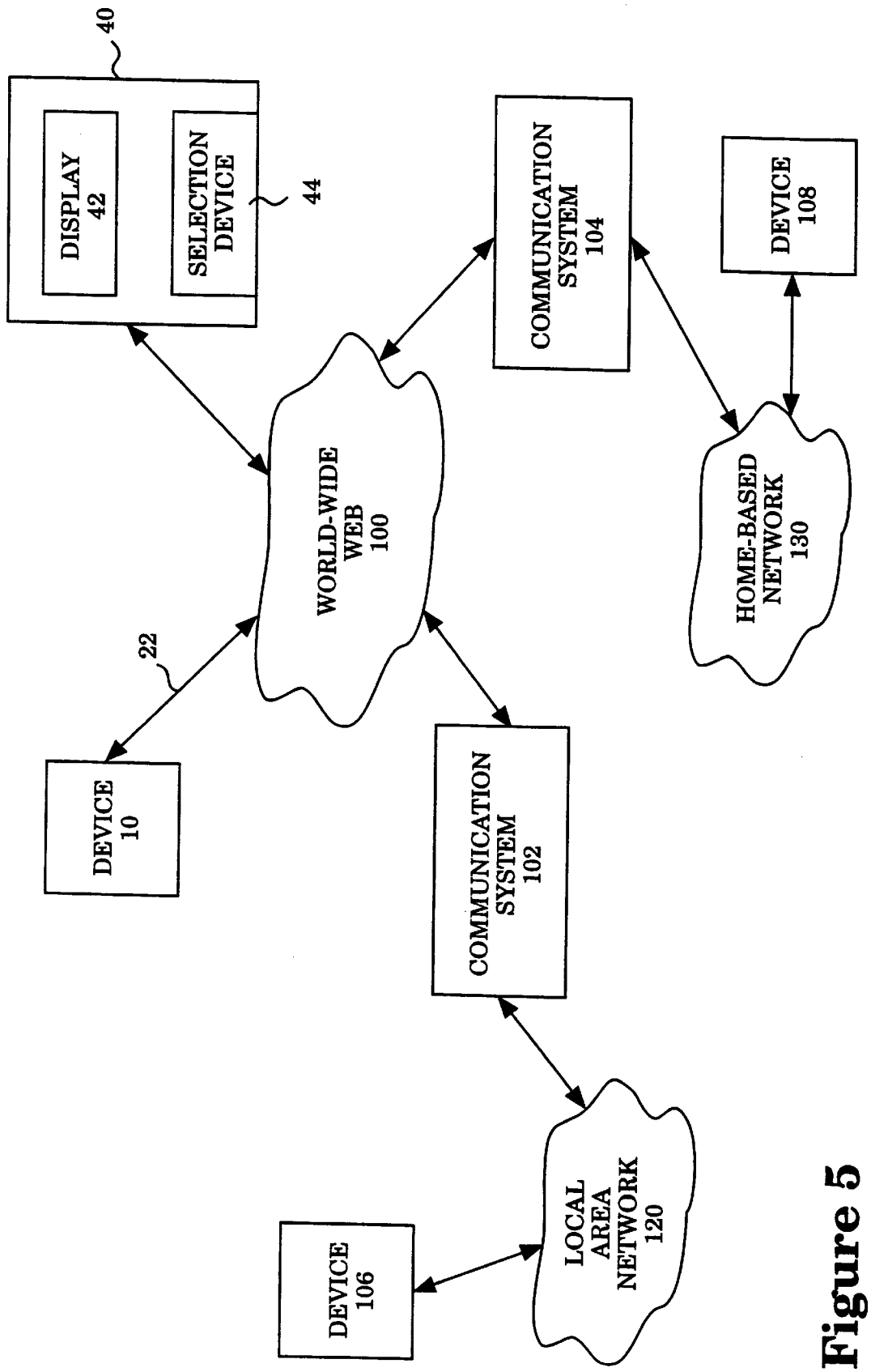
FIG. 5 illustrates access to device web pages through the Internet world-wide web.

FIG. 5 illustrates access to device web pages through a direct Internet connection to the worldwide web 100. The web page 18 of the device 10 may be accessed by any web client on the world-wide web 100 including the web browser 40.

In addition, a communication system 102 functions as a communication bridge between the world-wide web 100 and a local area network 120 and a communication system 104 functions as a communication bridge between the world-wide web 100 and a home base network 130. As a consequence, any other HTTP clients coupled to the local area network 120 or the home-base network 130 may access the device web pages in a device 108, a device 106, or the device 10. In addition, the web browser 40 or any HTTP client on the world-wide web 100 may access the device web pages of the devices 106 and 108.

The embedded web server functionality described herein enables a variety of widely accessible device interrogation and control functions for a particular device as well as for sets of devices. For example, a web page may be embedded into each washing machine of a chain of Laundromats wherein an operator from an office computer can determine the machines that require servicing and schedule daily service routing to the Laundromats accordingly.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A web access mechanism of a copier, comprising:
   a web server that generates a copier web page, wherein the copier web page provides a set of user interface functions for the copier, wherein some of the user interface functions enable control functions of the copier;
   a network interface coupled to the web server, the network interface enabling access to the copier web page by a web browser, the network interface being configured to permit a user of the web browser to access the user interface functions for the copier through the copier web page; and
   wherein the web access mechanism is embedded in the copier.

2. The web access mechanism of claim 1, wherein the web server is configured to receive an HTTP command via the network interface and then generate an HTML file that defines the copier web page in response to the HTTP command.

3. The web access mechanism of claim 2, wherein the HTTP command specifies a URL corresponding to the copier.

4. The web access mechanism of claim 3 further comprising a monitor coupled to the web server.

5. The web access mechanism of claim 2, wherein the HTML file contains at least one of (1) a set of information pertaining to the copier, (2) a set of URLs that control a set of predetermined functions for the copier wherein each URL may point to a web page located internal to the copier, and (3) a hyperlink to an external web page that specifies additional information pertaining to the copier.

6. A user interface method for a copier comprising the steps of:
   generating a copier web page within the copier, wherein the copier web page provides a set of user interface functions for the copier, wherein some of the user interface functions enable control functions of the copier; and
   providing access to the copier web page from a web browser external to the copier to permit a user of the web browser to access the user interface functions for the copier through the device web page.

7. The method of claim 6, wherein the step of generating a copier web page includes the step of generating an HTML file that defines the copier web page in response to an HTTP command received from the web browser.

8. The method of claim 7, wherein the HTTP command specifies a URL corresponding to the copier.

9. The method of claim 7, wherein the HTML file contains at least one of (1) a set of information pertaining to the copier, (2) a set of URLs that control a set of predetermined functions for the copier wherein each URL may point to a web page located internal to the copier, and (3) a hyperlink to an external web page that specifies additional information pertaining to the copier.

10. A system, comprising:

a copier having a web server that generates a copier web page wherein the copier web page provides a set of user interface functions for the copier and includes a set of information pertaining to the copier, the user interface functions enabling control functions of the copier, the copier also having a network interface that enables access to the copier web page via a communication network, wherein the web server and the network interface are embedded in the copier; and a web browser coupled to the communication network to enable a user of the web browser to access the user interface functions for the copier through the copier web page.

11. The system of claim 10, wherein the web server in the copier receives an HTTP command via the communication network and the network interface and then generates an HTML file that defines the copier web page in response to the HTTP command.

12. The system of claim 11, wherein the HTTP command specifies a URL corresponding to the copier.

13. The system of claim 11, wherein the HTML file contains at least one of (1) a set of URLs that control a set of predetermined functions for the copier such that the user of the web browser selects the URLs to control the predetermined functions of the copier wherein each URL may point to a web page located internal to the copier or a web page located external to the copier, and (2) a hyperlink to an external web page located elsewhere on the communication network that specifies additional information pertaining to the copier.

14. The system of claim 10, wherein the communication network comprises a home-based communication network, a large-organization communication network, or the world wide web of the Internet.

15. The system of claim 12 further comprising a monitor coupled to the web server.

16. A web access mechanism of a printer, comprising:

a web server that generates a printer web page, wherein the printer web page provides a set of user interface functions for the printer, wherein some of the user interface functions enable control functions of the printer;

a network interface coupled to the web server, the network interface enabling access to the printer web page by a web browser, the network interface being configured to permit a user of the web browser to access the user interface functions for the printer through the printer web page; and wherein the web access mechanism is embedded in the printer.

17. The web access mechanism of claim 16, wherein the web server is configured to receive an HTTP command via the network interface and then generate an HTML file that defines the printer web page in response to the HTTP command.

18. The web access mechanism of claim 17, wherein the HTTP command specifies a URL corresponding to the printer.

19. The web access mechanism of claim 18, wherein the HTML file contains at least one of (1) a set of information pertaining to the printer, (2) a set of URLs that control a set of predetermined functions for the printer wherein each URL may point to a web page located internal to the printer, and (3) a hyperlink to an external web page that specifies additional information pertaining to the printer.

20. The web access mechanism of claim 18, further comprising a monitor coupled to the web server.

21. A user interface method for a printer comprising the steps of:

generating a printer web page within the printer, wherein the printer web page provides a set of user interface functions for the printer, wherein some of the user interface functions enable control functions of the printer; and providing access to the printer web page from a web browser external to the printer to permit a user of the web browser to access the user interface functions for the printer through the device web page.

22. The method of claim 21, wherein the step of generating a printer web page includes the step of generating an HTML file that defines the printer web page in response to an HTTP command received from the web browser.

23. The method of claim 22, wherein the HTTP command specifies a URL corresponding to the printer.

24. The method of claim 22, wherein the HTML file contains at least one of (1) a set of information pertaining to the printer, (2) a set of URLs that control a set of predetermined functions for the printer wherein each URL may point to a web page located internal to the printer or a web page located external to the printer, and (3) a hyperlink to an external web page that specifies additional information pertaining to the printer.

25. A system, comprising:

a printer having a web server that generates a printer web page wherein the printer web page provides a set of user interface functions for the printer and includes a set of information pertaining to the printer, the user interface functions enabling control functions of the printer, the printer also having a network interface that enables access to the printer web page via a communication network, wherein the web server and the network interface are embedded in the printer; and a web browser coupled to the communication network to enable a user of the web browser to access the user interface functions for the printer through the printer web page.

26. The system of claim 25, wherein the web server in the printer receives an HTTP command via the communication network and the network interface and then generates an HTML file that defines the printer web page in response to the HTTP command.

27. The system of claim 26, wherein the HTTP command specifies a URL corresponding to the printer.

28. The system of claim 26, wherein the HTML file contains at least one of (1) a set of information pertaining to the printer, (2) a set of URLs that control a set of predetermined functions for the printer wherein each URL may point to a web page located internal to the printer or a web page located external to the printer, and (3) a hyperlink to an external web page that specifies additional information pertaining to the printer.

29. The system of claim 25, wherein the communication network comprises a home-based communication network, a large-organization communication network, or the world wide web of the Internet.

30. The system of claim 27, further comprising a monitor coupled to the web server.

31. A method of providing a web page to a user of office equipment, comprising:

embedding a web server within the office equipment, wherein the office equipment is a copier, a printer, or a fax machine;

connecting the web server to a computer network; and communicating to the web server with a web browser.

32. A method of obtaining information from a specific piece of office equipment, comprising:

assigning a Universal Resource Locator to the piece of office equipment wherein the office equipment is a copier, a printer, or a fax machine;

embedding a web server within the piece of office equipment;

sending an HTTP command, including a Universal Resource Locator, from a web client to the embedded web server; and providing the information from the web server to the web client where the Universal Resource Locator sent to the office equipment matches the assigned Universal Resource Locator.

\* \* \* \* \*